US008777205B2

(12) United States Patent

Hamm et al.

(10) Patent No.: US 8,777,205 B2

(45) Date of Patent: Jul. 15, 2014

(54) PIPE VISE STANDS AND COMPONENTS FOR INCREASING CAPACITY THEREOF

(75) Inventors: James E. Hamm, Grafton, OH (US); Christopher R. Miller, Swanton, OH (US); Robert Skrjanc, Lorain, OH (US)

(73) Assignee: Emerson Electric Co., St. Louis, MO (US)

( * ) Notice: Subject to any disclaimer, the term of this patent is extended or adjusted under 35 U.S.C. 154(b) by 441 days.

(21) Appl. No.: 13/005,040

(22) Filed: Jan. 12, 2011

(65) Prior Publication Data

US 2012/0175833 A1 Jul. 12, 2012

(51) Int. Cl.

*B25B 1/04* (2006.01)
*B23Q 3/02* (2006.01)
*B25B 1/24* (2006.01)
*B25B 5/16* (2006.01)

(52) U.S. Cl.

USPC ............ 269/266; 269/131; 269/130; 269/136

(58) Field of Classification Search

CPC ........... F16M 11/00; B25B 1/00; B25B 29/00
USPC .......................... 269/131, 130, 136, 266, 902
See application file for complete search history.

(56) References Cited

U.S. PATENT DOCUMENTS 798,371 A 8/1905 Ward
1,054,661 A 3/1913 Amborn
1,126,544 A 1/1915 Martin
1,158,414 A 10/1915 Amborn
1,184,991 A 5/1916 Pettit
1,216,610 A 2/1917 Rosenbaum
1,393,766 A 10/1921 Charme
1,634,837 A 7/1927 Lee
1,653,326 A 12/1927 Welter
1,686,023 A 10/1928 McCloskey
1,695,311 A 12/1928 Young
1,812,967 A 7/1931 Long
1,897,449 A 2/1933 Trowbridge
2,191,191 A 2/1940 Pealer
2,297,980 A 10/1942 Perkins
2,666,609 A 1/1954 Ingwer
2,703,027 A 3/1955 Petersen
2,733,330 A 1/1956 Blewett
2,831,583 A 4/1958 Wright et al.
2,978,114 A 4/1961 Halligan
3,656,439 A 4/1972 Domin
3,811,668 A * 5/1974 Kotter .......................... 269/258

(Continued)

OTHER PUBLICATIONS

The Ridge Tool Company, "Price List", Dec. 1, 1939, 13 pages.

(Continued)

*Primary Examiner* — Monica Carter
*Assistant Examiner* — Seahee Yoon
(74) *Attorney, Agent, or Firm* — Mark E. Bandy; Rankin, Hill & Clark LLP

(57) ABSTRACT

A pipe vise stand and system for increasing the size capacity of the pipe vise stand are described. Upon incorporation of the system in a pipe vise stand, the stand can accommodate pipes of significantly larger diameter. The system includes a pipe support member which is configured to be positioned on a vise base of the stand. The system also includes a jackscrew extender that provides or relocates a jackscrew associated with the stand to a lateral position alongside the stand. Related provisions and methods are also described.

32 Claims, 7 Drawing Sheets

(56) References Cited

U.S. PATENT DOCUMENTS

| | | | | |
|---|---|---|---|---|
| 4,083,624 | A | 4/1978 | Timmer | |
| 4,133,519 | A | 1/1979 | Shin et al. | |
| 4,210,373 | A | 7/1980 | McGee | |
| 4,231,557 | A | 11/1980 | Blachly et al. | |
| 4,349,931 | A * | 9/1982 | Leon | 470/207 |
| 4,715,760 | A | 12/1987 | Browning | |
| 6,189,853 | B1 * | 2/2001 | Kuhn | 248/676 |
| 6,471,220 | B1 | 10/2002 | Babb | |
| 7,430,968 | B2 | 10/2008 | Clark | |
| 2007/0080268 | A1 | 4/2007 | Worrell | |
| 2008/0029662 | A1 | 2/2008 | O'Rourke | |
| 2009/0194923 | A1 * | 8/2009 | Marineau et al. | 269/89 |

OTHER PUBLICATIONS

The Ridge Tool Company, "Genuine RIDGID Work-Saver Pipe Tools", Catalog, Aug. 7, 1961, pp. 1-28.
Emerson Professional Tools, "Portable TRISTAND Vises", website http://www.ridgid.com/Tools/Portable-Tristand-Vises, Feb. 9, 2010, 1 page.
Ridge Tool Company, "RIDGID Tristand Chain Vise", Catalog p. 999-998-422.10, Aug. 2004, 1 page.
Ridge Tool Company, "RIDGID Adjusting Tri-Stand Leg Stiffness", Catalog p. 999-998-461.10, Jul. 1998, 1 page.
Ridge Tool Company, "RIDGID Assembling Tri-Stand Legs and Tray", Catalog page, 1 page.
Berkley Tool Pipemaster, Catalog, 24 pages.
Steel Dragon Tools, "SDT 460 ⅛"-6" Tri Stand Chain Vise fits Ridgid 72037", website http://www.steeldragontools.com/item-detail.php-?pid=70, Feb. 9, 2010, 6 pages.
Steel Dragon Tools, "BC-610 Portable Bench Pipe Chain Vise SDT 40210", website http://www.steeldragontools.com/item-detail.php-?pid=64, Feb. 9, 2010, 3 pages.
Reed Pipe Tools & Vises, "Tripods—R450+, R470+, R40+", website http://www.reedmfgco.com/index.html?screen=tripods___r450__r470__r40, Feb. 9, 2010, 1 page.
Reed Pipe Tools & Vises, "Chain Vises", website http://www.reedmfgco.com/index.html?screen=chain__vises, Feb. 9, 2010, 1 page.
Maxpower Tools for Industry, "Max-Stand Chain Vise", website http://www.worldclasstoolsource.com/chain-vise.htm, Feb. 9, 2010, 1 page.
Silom, "Products : Vices & Workbench", website http://www.silom.co.uk/php/products.php?categoryid=1340, Feb. 9, 2010, 3 pages.
Rothenberger, "Vises & Pipe Stands", website http://www.rothenbergertools.us/471.html, Feb. 9, 2010, 2 pages.
Wheeler-Rex, "Pipe Working Tools", Catalog, Jan. 1, 2009, pp. 40-41.

* cited by examiner

PIPE VISE STANDS AND COMPONENTS FOR INCREASING CAPACITY THEREOF

FIELD OF THE INVENTION

The present invention relates to components for increasing the capacity of a pipe vise stand to enable the stand to accommodate larger pipe diameters. The invention also relates to the vise stands and various accessory components therefor.

BACKGROUND OF THE INVENTION

Pipe vise stands are typically portable and can be transported to a job or work site. Pipe vise stands are generally used for supporting and retaining pipe during a variety of operations such as threading, cutting, roll grooving, or welding. Pipe vise stands typically include a flat plate or base plate providing an upwardly directed work surface and a collection of extendable legs.

Vise stands can include numerous additional features and provisions. Many vise stands include jackscrew provisions for selectively engaging a stationary rigid member extending from overhead. For example, a vertical pipe positioned against a ceiling can be engaged with a jackscrew associated with a vise stand. Upon extending the jackscrew against the pipe, a downward force or load is applied to the stand, thereby significantly improving the stability of the stand.

Most pipe stands also include vise provisions for gripping and engaging a pipe. The vise provisions are typically in the form of a chain vise and include one or more upwardly directed jaw members for contacting a pipe, a chain having an end affixed or otherwise engageable with the stand, and provisions for taking up slack in the chain after wrapping the chain about the pipe.

As far as is known, portable pipe vise stands that use chain vises, can only accommodate pipes having diameters as large as about 6 inches. For larger pipes, larger vise stands having larger chain vises would be needed. Larger stands would be heavier and not as readily transportable as the previously noted vise stands that can accommodate pipes having diameters of about 6 inches or smaller. In addition, larger stands would typically be costlier. Thus, for an operator already having a vise stand capable of handling pipes up to about 6 inches, having to use a larger vise stand to accommodate larger pipes would require the purchase or rental, and transport of yet an additional vise stand.

Accordingly, a need exists in the art for a system and strategy whereby a readily portable pipe vise stand could be used to support and engage pipes having relatively large diameters, such as up to 12 inches or more.

SUMMARY OF THE INVENTION

The difficulties and drawbacks associated with previously known stands are addressed by the present pipe vise stand, system for increasing the size capacity of a pipe vise stand, and related methods.

In one aspect, the present invention provides a pipe vise stand comprising a plate defining a work face, an oppositely directed underside, an edge region extending between the work face and the underside, and an aperture extending through the plate between the work face and the underside. The plate includes vise provisions having a vise base projecting from the work face of the plate. The pipe vise stand also comprises a collection of legs attached to the plate and positionable between an extended position and a retracted position. The pipe vise stand additionally comprises a pipe support member disposed on the vise base. The pipe support member defines a pipe engaging face and an oppositely directed vise engaging face. The pipe support member is removable from the vise base. The pipe vise stand further comprises a jackscrew extender removably attached to the plate. The jackscrew extender defines a proximal end, an opposite distal end extending laterally outward and beyond an edge region of the plate, and a medial region between the proximal end and the distal end. The jackscrew extender defines an aperture in the distal end configured to receive a jackscrew.

In yet another aspect, the present invention provides a system for adapting a pipe vise stand to accommodate pipes having larger diameters. The system comprises a pipe support member defining a centrally disposed region and at least two members extending laterally from the central region. The at least two members extend at an angle with respect to each other of from about 30° to about 160°. The pipe support member defines a pipe engaging face and an oppositely directed vise engaging face. The system also comprises a jackscrew extender defining a proximal end, a distal end, and a medial region between the proximal end and the distal end. The distal end is adapted to receive a jackscrew. And, the medial region defines a bore extending at least partially through the jackscrew extender.

In yet another aspect, the present invention provides a method for increasing the diameter of pipes with which a pipe vise stand can be used. The method comprises providing a pipe vise stand including a plate defining a work face, an oppositely directed underside, and a peripheral edge extending between the work face and the underside. The plate includes vise provisions having a vise base. The pipe vise stand also includes a plurality of legs attached to the plate. The method also comprises providing a pipe support member defining a pipe engaging face and an oppositely directed vise engaging face, the pipe support member being separate and non-integral with the vise provisions. The method additionally comprises providing a jackscrew extender defining a proximal end, a distal end, and a medial region between the proximal end and the distal end, the jackscrew extender including a jackscrew along the distal end of the extender. The method further comprises positioning the pipe support member on the vise base of the vise provisions such that the vise engaging face of the pipe support member contacts the vise base. And, the method also comprises affixing the jackscrew extender to the plate of the pipe vise stand such that the distal end of the extender and the jackscrew included therewith are disposed laterally outward and beyond the edge of the plate.

As will be realized, the invention is capable of other and different embodiments and its several details are capable of modifications in various respects, all without departing from the invention. Accordingly, the drawings and description are to be regarded as illustrative and not restrictive.

DETAILED DESCRIPTION OF THE EMBODIMENTS

Figure 1:
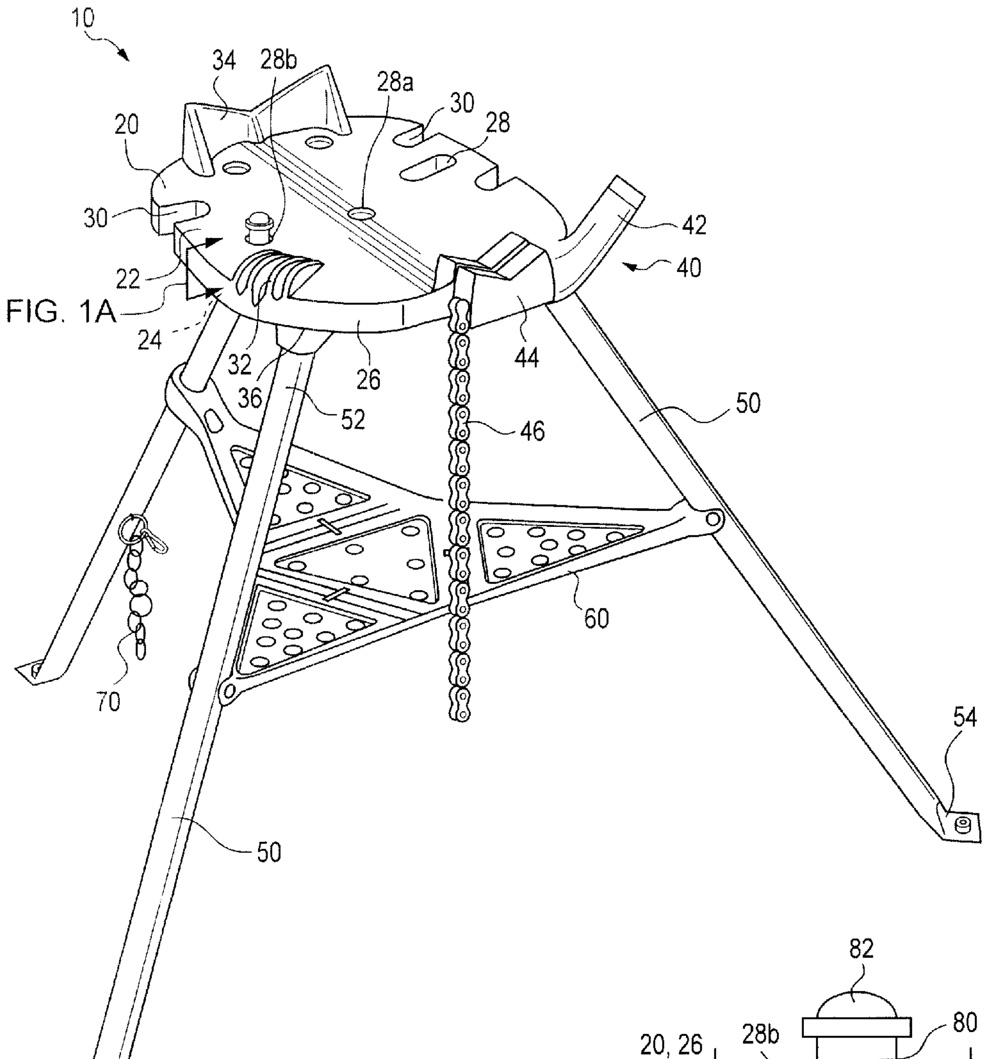
FIG. 1 is a perspective view of a typical pipe vise stand to which the present invention is directed.

The present invention provides various preferred embodiments relating to pipe vise stands and accessory systems therefor. A preferred pipe vise stand is provided which features a base plate defining an upwardly directed work face and which includes vise provisions, and a collection of legs attached to the plate and preferably along the underside of the plate. Various references to "up", "upward", "underside" and the like are made herein. These orientation references are made with regard to the stand in a typical configuration during use, e.g. the stand having its legs fully extended and the stand positioned upright upon a floor. Preferably, the legs are positionable between an extended position such as during use of the stand, and a retracted position such as when transporting the stand. A brace or assembly tray can be used which is coupled to the legs and increases stability of the legs and plate upon extension of the legs. The preferred pipe vise stand also includes a detachable pipe support member that when used, is disposed on a vise base on the plate. The pipe support member preferably defines an upwardly directed serrated pipe contacting face, and an oppositely directed underside that contacts the vise base on the plate. The pipe support member can be removed from the vise base. The vise stand also includes a jackscrew extender that is removably attached to the underside of the plate. The extender defines a proximal end, an opposite distal end that extends laterally outward and beyond an edge region of the plate, and a medial region between the proximal and distal ends. The extender is adapted to receive a jackscrew at its distal end. Upon urging a jackscrew engaged in the distal end of the jackscrew extender against a stationary rigid member such as a downwardly extending pipe, the stability of the stand can be significantly increased. As explained in greater detail herein, by use of the pipe support member and the jackscrew extender, the range of pipe diameters with which the stand can be used, is significantly increased. Generally, this will also involve lengthening the vise chain.

Another preferred embodiment of the invention relates to a system for adapting a pipe vise stand to accommodate pipes having relatively large diameters. The system comprises a pipe support member that includes a centrally disposed region and at least two members extending laterally outward from the central region. The lateral members are preferably oriented at an angle with respect to each other of from about 30° to about 160°. The system also comprises a jackscrew extender that defines a proximal end and an opposite distal end. Upon attachment of the proximal end to a base plate of a pipe vise stand, the distal end extends laterally outward and beyond an edge region of the base plate. The distal end of the jackscrew extender is adapted to receive a jackscrew. Preferably, both the pipe support member and the jackscrew extender are removable from and selectively attachable to a pipe vise stand. However, it will be appreciated that the present invention includes embodiments in which either or both of the pipe support member and the jackscrew extender are integral with the base plate.

FIG. 1 illustrates a typical pipe vise stand 10 to which the present invention is directed. The stand 10 comprises a plate 20, vise provisions 40 generally associated with or formed in conjunction with the plate 20, and a plurality of legs 50 coupled to or engaged with the plate 20. Each leg defines a proximal end 52 and an opposite distal end 54. The plate 20, further illustrated in FIG. 2, defines a work face 22, an oppositely directed underside 24, and an edge 26 extending about the peripheral region of the plate 20 between the faces 22 and 24. The plate 20 may define one or more apertures 28 which extend through the plate 20 and preferably between the faces 22 and 24. The plate 20 may also define one or more slots 30 along the edge 26. The various apertures such as apertures 28*a* and 28*b*, described in greater detail herein, and slots 30 may serve as locations for affixment of components, as described herein and/or as regions for supporting or hanging tools or other accessories from the plate 20. The plate 20 may optionally include provisions for bending tubes or pipes such as one or more arcuate bending mandrels referred to herein as a tube bender 32. The tube bender 32 can be located in any suitable location along the plate 20, however a preferred location is proximate the edge 26 of the plate 20. The plate 20 preferably also comprises one or more uprights 34 which are preferably located along the edge 26 of the plate 20 and generally opposite from the vise provisions 40. The upright 34 serves to support a workpiece such as a pipe which may be engaged in the vise provisions 40. The upright 34 may be provided in a wide array of forms, however an upwardly extending member defining a recessed region for receiving a pipe as shown, is generally preferred. Generally provided along the edge 26 or the underside 24 of the plate 20 as shown in FIG. 1, the plate 20 also preferably comprises a plurality of leg receptacles 36. Each receptacle is located along the plate 20 and sized and shaped to receive or otherwise engage a proximal end 52 of a leg 50.

Figure 1A:
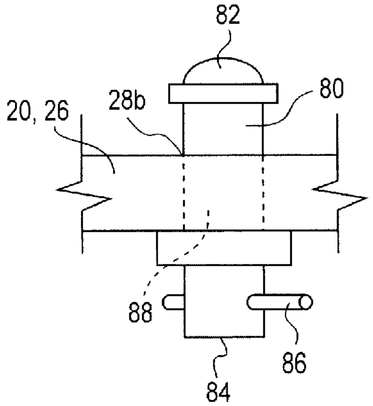
FIG. 1A is a side elevational schematic view of a region of the stand depicted in FIG. 1 showing a jackscrew.

FIG. 1A is a side elevational view of a region of the base plate 20 of the stand 10 illustrating a conventional jackscrew 80 that is threadedly engaged in threaded aperture 28*b*. Typical jackscrews such as jackscrew 80 generally include a longitudinal member defining an upwardly extending member 82 and an opposite end 84 having handle provisions 86 disposed under the base plate 20. The jackscrew 80 includes a threaded region such as region 88 depicted in FIG. 1A which is sized and configured to engage the threaded aperture 28*b*. As will be appreciated, upon rotating the jackscrew 80 about its longitudinal axis, the member 82 is displaced relative to the plate 20.

Figure 2:
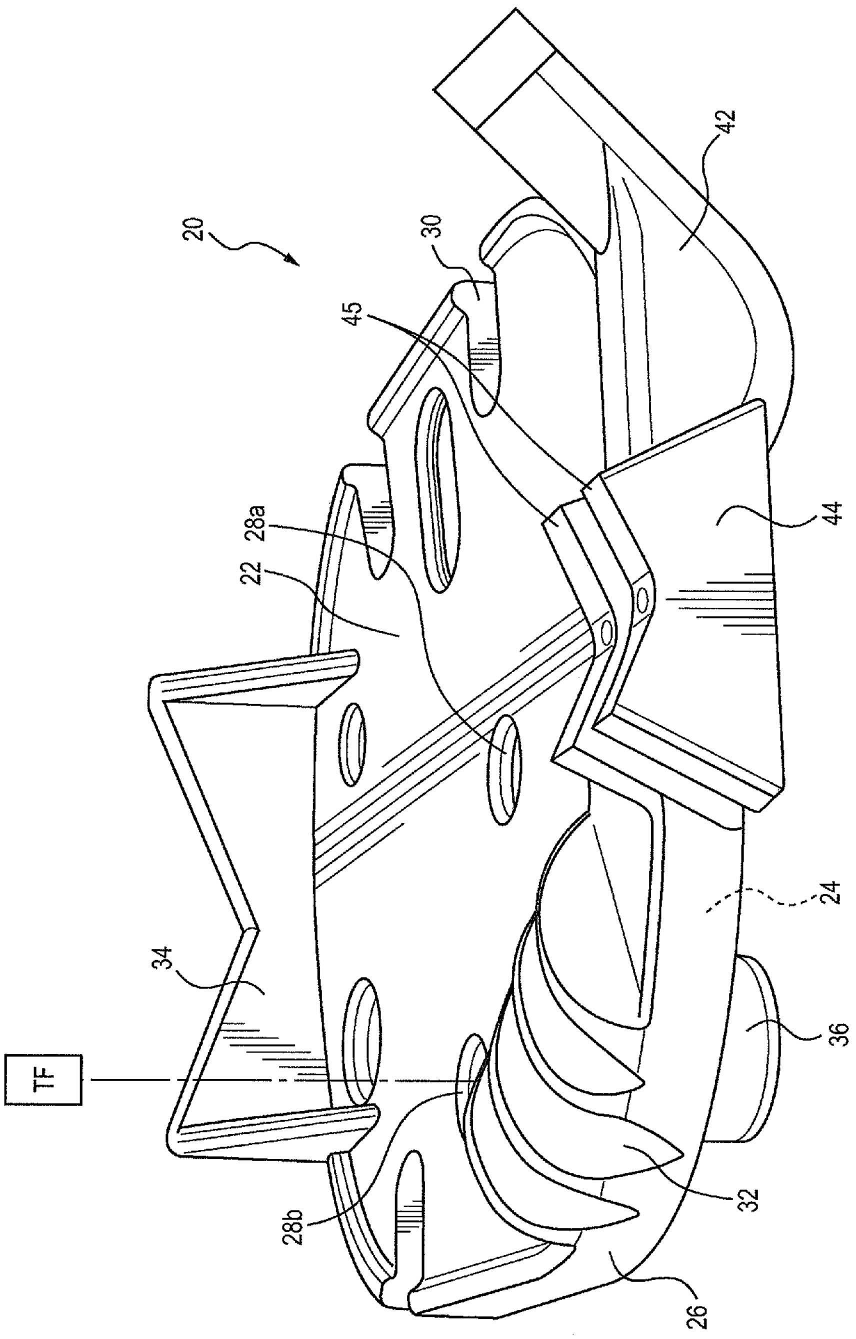
FIG. 2 is a detailed perspective view of a plate used in the pipe vise stand illustrated in FIG. 1.

Referring to FIGS. 1 and 2, the vise provisions 40 preferably comprise a handle base 42, a vise base 44, and a chain 46. The handle base 42 and the vise base 44 are preferably integrally formed as part of the plate 20. However, it will be appreciated that the present invention includes other configurations such as a handle base and/or a vise base which are removably affixed to the plate and not formed integrally therewith. The vise base 44 defines an upwardly directed face 45 (see FIG. 2) which can serve to contact a workpiece such as a pipe when positioned therein. The chain 46 is preferably engaged at one end to a screw assembly thereby enabling its free end to be positioned about a workpiece or pipe when disposed on the vise base 44. The free end can then be engaged to the plate 20 or other stationary member. The workpiece or pipe is engaged and retained by the vise provisions 40 by wrapping the chain about the workpiece, and then attaching the free end of the chain as previously noted. Upon rotation by a handle (not shown) in the handle base 42, the adjustment assembly takes up any slack in the chain and tightens the chain about the workpiece. It will be understood that the invention can be used in conjunction with a wide array of vices and vise bases and in no way is limited to the version depicted in the figures. Representative examples of features, construction, assembly, materials, and other aspects of chain vises are provided in one or more of the following U.S. Pat. Nos. 4,349,931, 1,158,414; 2,703,027; and 1,054,661.

As noted, pipe vise stand 10 comprises a plurality of legs 50. The legs 50 are each moveably affixed to the plate 20 and preferably along the underside 24 of the plate. The legs may be selectively removable from the plate to facilitate disassembly and/or transport of the stand 10. The stand 10 preferably also comprises a brace assembly 60 engaged with each of the legs 50 at an intermediate location along each leg 50 between its proximal and distal ends 52 and 54, respectively. The brace assembly 60 is preferably in the form of a collection of hinged members configured such that upon extension of the legs 50, the brace assembly forms a relatively rigid structure that serves to further increase stability of the stand 10.

A wide array of additional features and components may be included in conjunction with the stand 10. For example, one or more fastening members 70 can be provided along the legs 50 and/or the plate 20 which upon retracting the legs 50, can be extended and secured about the legs to prevent unintended leg extension. A preferred embodiment securing assembly is described in greater detail herein.

Figure 3:
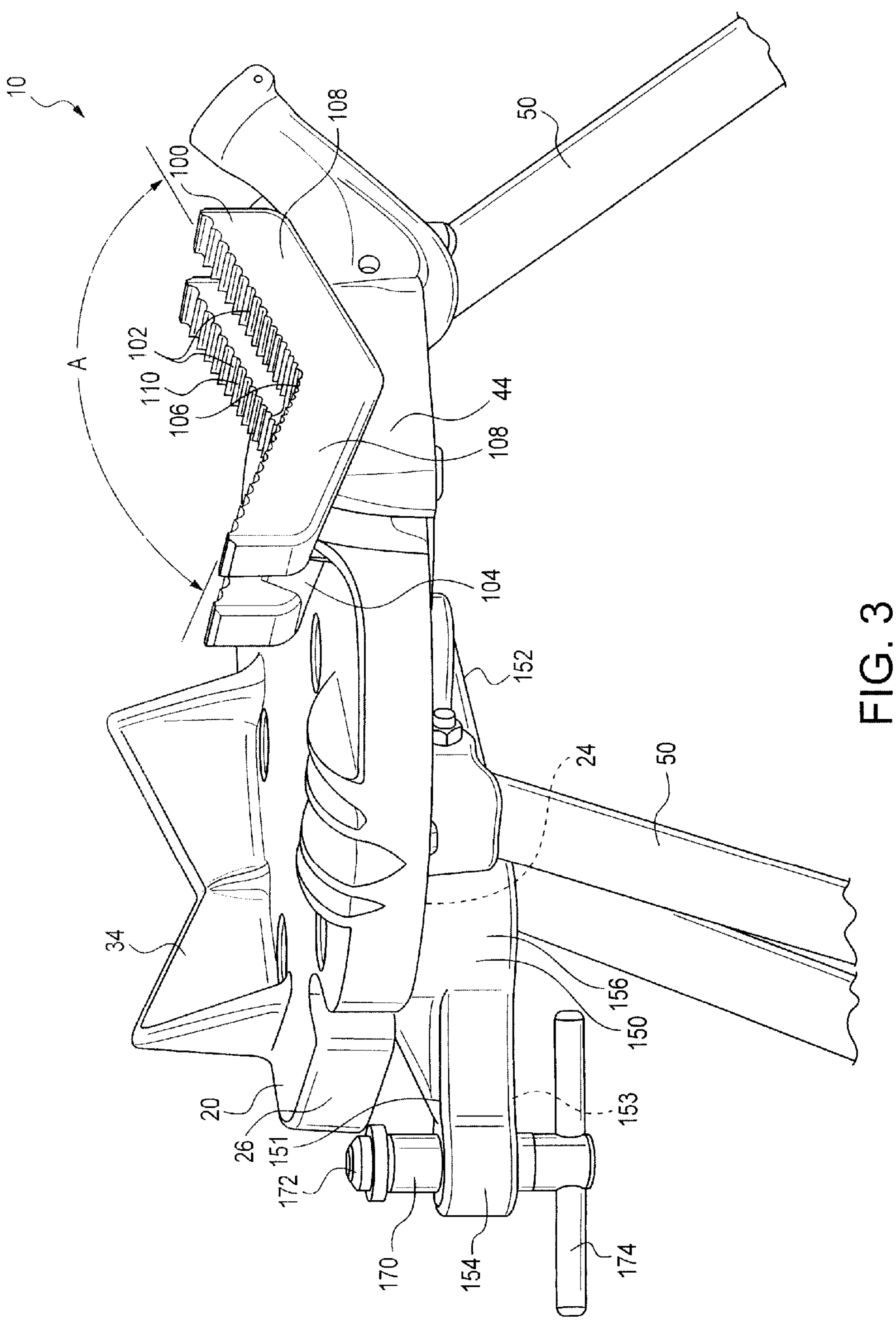
FIG. 3 is a partial perspective view of the pipe vise stand including several preferred embodiment components for increasing the capacity of the stand in accordance with the present invention.

FIG. 3 illustrates the pipe vise stand 10 further comprising a preferred embodiment pipe support member 100 and a jackscrew extender 150 in association with the plate 20. The pipe support member 100 is positioned on the vise base 44. The pipe support member 100 defines an upwardly directed pipe engaging face 102 and a generally oppositely directed vise engaging underside 104. Preferably, upon positioning the pipe support member 100 on the vise base 44, the underside 104 of the member 100 contacts the face 45 (see FIG. 2) of the vise base 44. The pipe support member 100 includes a central member or region 106 and two or more outwardly extending lateral members 108 extending from the central region 106. Each of the lateral members 108 defines an upwardly directed face or provides a portion of the previously noted pipe engaging face 102. One or more serrations 110 are preferably provided along the upwardly directed face of the lateral members 108 or along the pipe engaging face 102 of the support member 100. The lateral members 108 preferably extend from opposite portions of the central region 106 and most preferably, extend outward at an angle with respect to each other. This angle is referred to herein as angle A and is illustrated in FIG. 3. Generally, this angle A is less than 180° and preferably from about 30° to about 160°. Most preferably, the angle between these members is from about 100° to about 150°. The inclined orientation of the lateral members 108 results in the pipe support member 100 exhibiting a V-shaped configuration. A preferred feature of the pipe support member 100 is that the surface area of the upwardly directed face 102 for contacting a pipe or other member is greater than the surface area of the upwardly directed face 45 of the vise base 44. Although the greater surface area of the face 102 of the support member 100 typically results from a greater span of the lateral members 108 as compared to a corresponding span of the vise base 44, the invention includes other configurations for the support member 100 having an increased surface area. Preferably, the surface area of the face 102 of the support member 100 is greater than 110% of the surface area of the face 45 of the vise base 44, more preferably greater than 125%, and most preferably greater than 150% or more. In certain embodiments of the invention, significant increases in surface area of supporting members can be achieved. For example, a typical surface area of face 45 in FIG. 2 is about 6.4 inches$^2$. By use of the preferred embodiment pipe support members, significant increases in surface area can be achieved. For example, the face 102 of the pipe support member 100 has a typical surface area of about 14.8 inches$^2$. Thus, by use of the preferred pipe support member 100, an increase in surface area of about 2.3 times or 230% can be achieved. It will be appreciated that in no way is the invention limited to these particular surface area values or percentages. That is, it is contemplated that even greater increases in surface area can be achieved.

In other alternate embodiments, a pipe support member could be provided that defined an upwardly directed face having a surface area that was not significantly greater than the corresponding upwardly directed face of the underlying vise base. For example, it is contemplated that such a pipe support member could feature relatively long outwardly extending lateral members (such as members 108 depicted in FIG. 3), yet configured so that the width of each lateral member was reduced such that the total surface area of the face was approximately equal to or less than the surface area of the upwardly directed face of the underlying vise base. The invention includes other configurations of pipe support members having surface areas of their faces equal to or less than the surface area of the noted vise base face. However, it will be understood that in accordance with the invention it is generally preferred that the surface area of the face of the preferred pipe support member be greater than the surface area of the vise base face.

Preferably, when using a preferred embodiment pipe support member as described herein, it may be necessary to replace the chain provided in association with the vise, with a longer chain. As will be appreciated, use of the various pipe support members increase the size of pipes with which the stand can be used. Larger size pipes have greater diameters and thus larger circumferences. As most chains provided with conventional pipe stands are 28 inches in length, in order to accommodate relatively large pipes, it is preferred to use a chain having an increased length, such as greater than 28 inches, preferably from about 40 inches to about 50 inches, and most preferably about 48 inches in length.

FIG. 3 also illustrates a preferred embodiment jackscrew extender 150 engaged along the underside 24 of the plate 20. The extender 150 defines a proximal end 152, an opposite distal end 154, and a medial region 156 extending between the ends 152 and 154. The extender 150 also defines upper and lower faces 151 and 153, respectively. The extender 150 includes provisions for engaging a jackscrew such as a jackscrew 170 along the distal end 154 of the extender 150. Preferably, the jackscrew 170 is threadedly engaged with the extender 150 and defines a contact face 172 and handle provisions 174. Upon affixment of the jackscrew extender 150 to the underside 24 of the plate 20, the distal end 154 of the jackscrew 170 is positioned laterally outward and beyond the edge 26 of the plate 20. As will be understood, upon rotation of the jackscrew handle provisions 174, the jackscrew 170 is linearly displaced relative to the extender 150, thereby enabling an operator to selectively position the contact face

172 against an appropriately positioned stationary rigid member (not shown). Continued rotation of the jackscrew handle provisions 174 results in application of a load or force upon the extender 150 and thus the plate 20.

Figure 4:
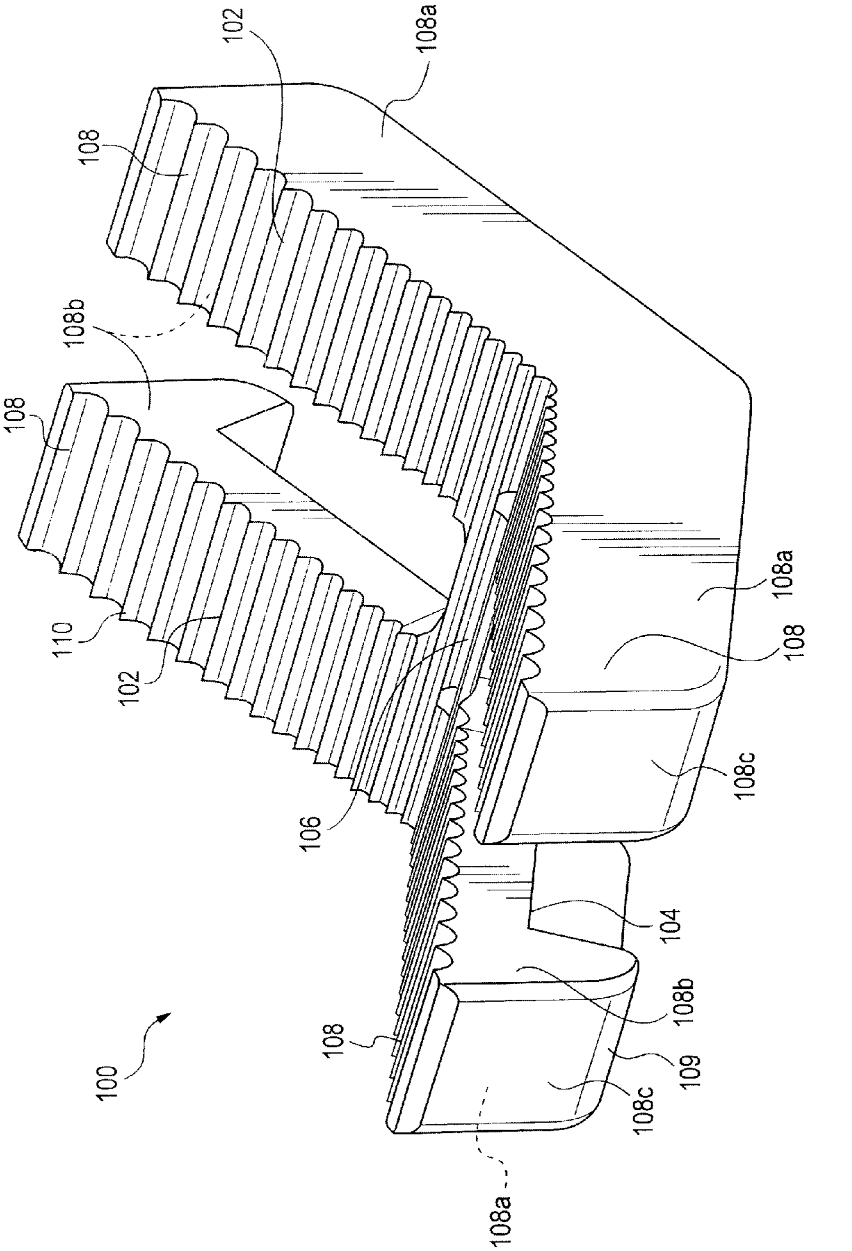
FIG. 4 is a perspective view of a preferred embodiment pipe support member in accordance with the present invention.

FIG. 4 illustrates the preferred embodiment pipe support member 100 in isolation and in greater detail. As noted, the member 100 comprises a central member 106 and a plurality of outwardly extending lateral members 108. Although it is generally preferred that the support member 100 be a one piece integrally formed component, the invention includes assemblies of central member 106 and one or more lateral members 108. For example, it is contemplated that multiple and separate components could be used for one or more of the laterally extending members and/or for the pipe support members. Such multi-component assemblies could be fashioned from engageable components that are affixed to one another and/or to select regions of the base plate and/or the vise base. The members 108 are preferably oriented to define a recessed region centered above the central member 106. Although the pipe support member 100 is depicted as having four symmetrically arranged lateral members 108, it will be appreciated that the present invention includes a lesser number and a greater number of lateral members 108. For example, in an alternative embodiment, a pipe support member could be provided with only two lateral members. The pipe support member 100 may optionally include one or more grounding lugs such as a lug (not shown) extending from the member 100. Grounding lugs may serve as a point of attachment by a grounding cable used in an electric arc welding system. As noted, defined along a face or region of the pipe support member 100 generally opposite from the pipe engaging face 102, is a vise engaging underside 104. The underside 104 defines one or more recessed regions that are preferably sized and shaped to fittingly engage the vise base 44 as best shown in FIG. 1. Each lateral member 108 defines an outer face 108*a*, an oppositely directed inner face 108*b*, and an outwardly directed end face 108*c* extending between the faces 108*a* and 108*b*. Although the pipe support member 100 includes a wide range of configurations for the lateral members, the lateral members 108 of the pipe support member 100 depicted in FIG. 4 each preferably include a distal capture member 109 that extends downward from the upwardly directed pipe engaging face 102. The distal capture members 109 in conjunction with the vise engaging underside 104, serve to fittingly engage the pipe support member 100 to the vise base 44 of the vise provisions 40. The previously noted optional grounding lug could conceivably project or extend from any region of the pipe support member 100. As previously noted, one or more serrations 110 are provided along the pipe engaging face 102.

Figure 5:
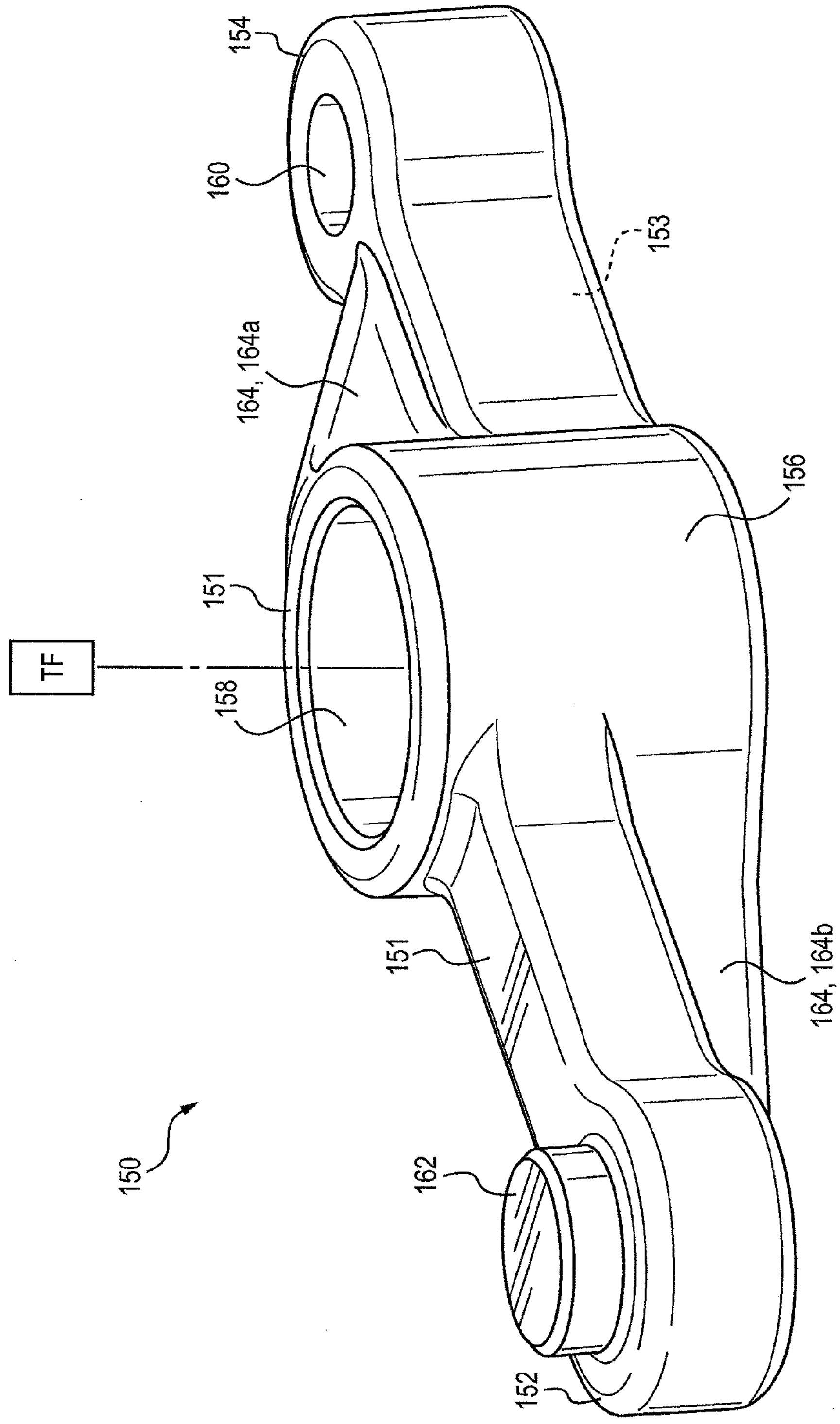
FIG. 5 is a perspective view of a preferred embodiment jackscrew extender in accordance with the present invention.

FIG. 5 illustrates the preferred embodiment jackscrew extender 150 in isolation and in greater detail. As previously described, the extender 150 defines proximal and distal ends 152 and 154, respectively, and a medial region 156 extending therebetween. A primary aperture or bore 158 preferably is defined along the medial region and most preferably extending between the upper face 151 and the underside 153 of the extender 150. A secondary aperture 160 is provided along the distal end 154 of the extender 100 and preferably also extending between the upper and underside faces 151 and 153, respectively, of the jackscrew extender 150. The extender 150 preferably additionally comprises an upwardly extending alignment projection 162 located along the proximal end 152 of the extender 150. The jackscrew extender 150 may further comprise one or more reinforcement ribs 164 extending along either or both of the faces 151 and 153. Preferably, the extender 150 includes a first rib 164*a* extending along the upper face 151 between the medial region 156 to the distal end 154. And, preferably the extender 150 includes a second rib 164*b* extending along the underside 153 between the medial region 156 to the proximal end 152. The primary aperture or bore 158 may extend entirely through the medial region 156 of the jackscrew extender 150, or only partially through. Furthermore, the axes of the primary aperture 158 and the secondary aperture 160 are preferably parallel with one another. It will be understood that the present invention includes an array of configurations for the jackscrew extender. For example, additional support ribs or different ribs can be used in conjunction with the jackscrew extender shown in FIG. 5. The jackscrew extender depicted in FIG. 5 is merely an example of one of many preferred embodiment extenders in accordance with the invention.

The jackscrew extender 150 is selectively affixed to the underside 24 of the plate 20 as follows. Referring to FIGS. 2 and 5, the jackscrew extender 150 is positioned under the plate 20 such that the upper face 151 of the extender 150 is directed toward the underside 24 of the plate 20, the alignment projection 162 of the extender 150 is positioned under and preferably generally aligned with an aperture such as aperture 28*a* defined in the plate 20, and the primary aperture 158 in the extender 150 is positioned under and preferably generally aligned with another aperture such as aperture 28*b* defined in the plate 20. The jackscrew extender 150 is then contacted with the underside 24 of the plate 20 and the alignment projection 162 is inserted within the aperture 28*a*. A threaded fastener shown schematically in FIGS. 2 and 5 as "TF" or other affixment means is inserted through the aperture 28*b* in the plate 20 and the primary aperture 158 in the jackscrew extender 150. The fastener can threadedly engage one or both of those components or engage a corresponding threaded fastener along its end to thereby engage the extender to the plate. As previously noted, the distal end 154 of the jackscrew extender 150, and particularly, the secondary aperture 160, is adapted to receive a jackscrew or jackscrew assembly. Preferably, the jackscrew, such as jackscrew 170 depicted in FIG. 3, includes a longitudinal shaft member (not shown) which defines a helical thread or like projecting member along its outer circumferential surface. The extender 150 is preferably adapted to receive the jackscrew by forming secondary aperture 160 of the extender, to define a corresponding helical groove along the interior wall of the aperture 160. As will be appreciated, the shape, size, and configuration of the groove defined along the secondary aperture 160 preferably correspond to that of the helical thread of the jackscrew. Alternative configurations are encompassed by the present invention.

Preferably, a base plate defines a threaded aperture extending through the plate such as aperture 28*b*. When adapting the base plate to accommodate larger pipes and the like and when using a preferred embodiment jackscrew extender such as extender 150, it is preferred that the extender is sized and configured to be used with a pre-existing threaded aperture in the base plate. Thus, when adapting a conventional base plate for use with larger pipes, an existing jackscrew such as jackscrew 80 depicted in FIG. 1A is removed from its threaded aperture 28*b*. The preferred embodiment jackscrew extender is positioned under the base plate and aligned with the threaded aperture within which the jackscrew 80 was previously disposed. The preferred embodiment jackscrew extender is sized such that its primary aperture 158 is aligned with and positioned under the existing threaded aperture extending at least partially through the plate, e.g. aperture 28*b*, and most preferably also such that the alignment projection 162 of the extender 150 is engaged and positioned within another aperture defined in the base plate, e.g. aperture 28*a*. The preferred embodiment jackscrew extender is then affixed to the base plate by a threaded fastener extending through the primary aperture 158 and the aperture 28*b*. As noted, the jackscrew extender is also oriented such that the alignment projection 162 is disposed within or otherwise engages the aperture 28*a*. Although it is generally preferred that the jackscrew extender will include its own jackscrew such as jackscrew 170 depicted in FIG. 3, the invention also includes configurations in which the jackscrew previously provided in association with the plate such as jackscrew 80 depicted in FIG. 1A, is incorporated with the jackscrew extender and used therewith.

The various components of the vise stands described herein can be formed from nearly any suitable material having sufficient strength, durability, and rigidity for the stands to function as described herein. Metals such as various grades of hardened steel are preferred. Other metals such as alloys of aluminum, magnesium, and the like are also contemplated. It is further envisioned that composite materials could be used for certain components.

Representative examples of features, construction, assembly, materials, and other aspects of vise stands and pipe vise stands are provided in one or more of the following U.S. Pat. Nos. 1,634,837; 798,371; 1,216,610; 4,715,760; 1,686,023; 1,393,766; 1,126,544; 4,231,557; and 7,430,968. In addition, such information is also noted in US Patent Application Publication US 2007/0080268.

Generally, the pipe support member and the jackscrew extender as described herein, upon attachment to a base plate of a vise stand, significantly increase the capacity of the vise stand. Specifically, use of the preferred support member and the preferred jackscrew extender increase the range of pipe diameters with which a pipe vise stand can be used. For example, for a typical portable pipe vise stand capable of accommodating pipes having a diameter up to about 6 inches, by use and incorporation of the pipe support member and the jackscrew extender as described herein, the pipe vise stand can typically accommodate pipes having diameters as large as 12 inches or more.

As described herein, the invention provides various vise stands and systems for use with vise stands. The invention also provides methods for increasing the range of pipe diameters with which a vise stand can be used. The methods involve obtaining or otherwise providing the pipe support member and/or the jackscrew extender and engaging those components with a vise stand and preferably, with a plate of a vise stand as described herein.

Furthermore, it will be understood that although in accordance with the present invention, it is preferred that both components are utilized, i.e. the pipe support member and the jackscrew extender, the invention includes the use of only one of these components by itself or in conjunction with one or more components.

In certain embodiments, it may be preferred to include one or more leveling provisions for the vise stands. Leveling provisions enable an operator to adjust the orientation of the base plate. Preferably, the leveling provisions are provided in association with at least one of the legs, and most preferably in association with two legs. It is also contemplated that leveling provisions can be provided in association with each leg. As explained herein, it is most preferred that the leveling provisions enable an operator to adjust the orientation of the base plate while the stand is under a load, such as while supporting a workpiece and/or during application of a stabilizing load such as from a jackscrew.

A wide array of different assemblies and strategies can be used to enable leveling of the vise stands of the invention. For example, leveling provisions can be in the form of threaded leg members such that rotation of a leg member results in linear extension or retraction of the leg member along its longitudinal axis. Another form of leveling provisions is the use of threaded members disposed on the distal ends of the legs. The extent of adjustment of the leveling provisions is preferably such that the orientation of the base plate can be changed by at least +/−3°, and more preferably by at least +/−5°

The leveling provisions can include gross leveling adjustments and fine leveling adjustments. For example, gross adjustments can be in the form of telescoping leg sections engaged with one another by a member that is inserted into aligned apertures formed in the leg sections. A collection of apertures are preferably formed in each leg section. Upon appropriate positioning of one leg section to another to a desired leg length and alignment of a corresponding pair of apertures, the member is inserted into the aligned apertures thereby engaging the leg sections together.

Fine leveling provisions can be provided by threaded members disposed at the distal ends of the legs. Similarly, incorporating threaded regions along a length portion of a leg or leg section could also be used for fine leveling provisions or gross leveling provisions depending upon the thread characteristics and thread spacing.

Optional locking provisions can be included in association with the leveling in association with the leveling provisions. Locking provisions can be in a wide variety of forms such as threadedly engaged locking members, locking nuts, and the like.

Figure 6:
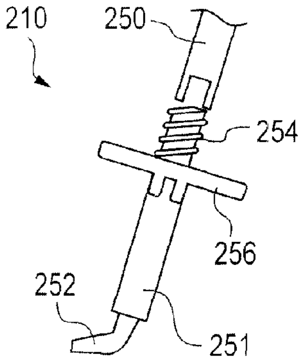
FIG. 6 is a schematic illustration of a preferred embodiment leveling provision in accordance with the present invention.

FIG. 6 schematically illustrates a preferred embodiment leveling provision 210 provided in association with a leg 250 of a vise stand, such as stand 10 depicted in FIG. 1. The leg 250 defines a distal end 252 and a proximal end (not shown) at which the leg 250 is coupled or otherwise engaged to a base plate (not shown). The leveling provision 210 is preferably located between the distal and proximal ends of the leg 250 and in this version, includes a first threaded member 254 engaged to a proximal portion of the leg and a second correspondingly threaded member 256 threadedly engaged therewith. The second threaded member 256 is engaged to a distal portion of the leg 250. As will be appreciated, upon rotation of the second member 256, the distal end 252 of the leg 250 is linearly displaced along the longitudinal axis of the first threaded member 254 and the leg 250. Preferably, key provisions are provided in association with the distal end 252 so that upon desired positioning of the distal end 252, that end is precluded from rotating about the longitudinal axis of the leg 250. In a preferred configuration, the threaded member 256 engages a lower leg portion 251 to capture the leg portion 251 and attach the portion 251 to the leg 250.

Figure 7:
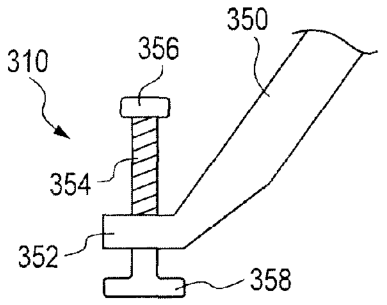
FIG. 7 is a schematic illustration of another preferred embodiment leveling provision in accordance with the present invention.

FIG. 7 schematically depicts yet another embodiment of a leg leveling provision 310 provided in association with a leg 350. The leveling provision 310 is preferably located proximate a distal end 352 of the leg 350. The provision 310 includes a threaded member 354 having a head 356 adapted to be engaged with a wrench or other suitable tool and an opposite foot 358. The member 354 extends through the distal end 352 of the leg 350 and is threadedly engaged therewith. As will be appreciated, upon rotation of the member 354, the linear distance between the foot 358 and the distal end 352 of the leg 350 can be adjusted.

Figure 8:
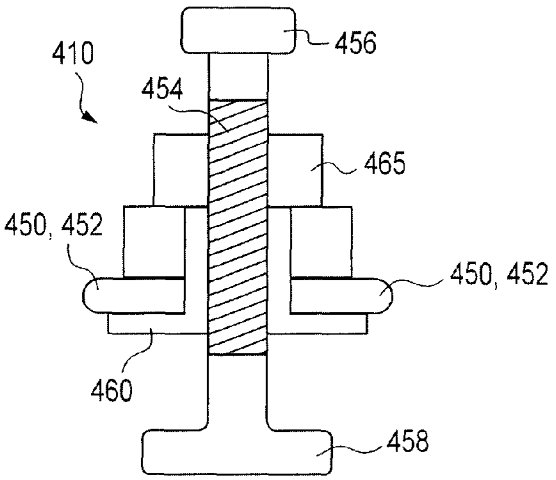
FIG. 8 is a detailed schematic illustration of another preferred embodiment leveling provision in accordance with the present invention.

FIG. 8 schematically depicts yet another leveling provision 410 and its incorporation in a distal end 452 of a leg 450. The leveling provision 410 includes a threaded member 454 having a head 456 and a foot 458. A threaded foot insert 460 is disposed within an aperture defined in the leg distal end 452. Upon selectively rotating the member 454 to a desired position relative to the distal end 452 of the leg 450, a locking nut 465 can be used to secure the member 454 in the desired position.

Figure 9:
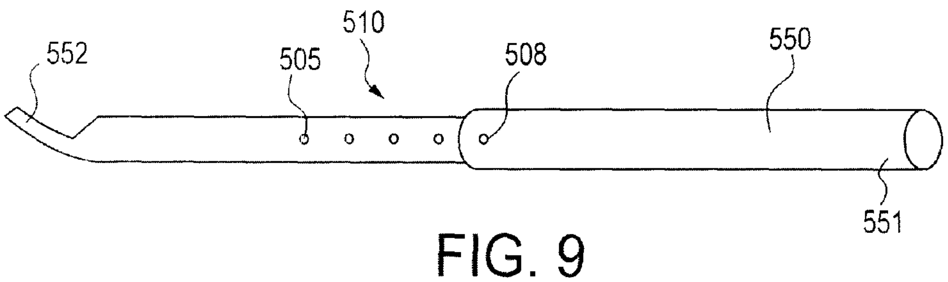
FIG. 9 is a detailed schematic view of another preferred embodiment leveling provision in accordance with the present invention.

FIG. 9 schematically depicts another leveling provision 510 provided in association with one or more legs 550 of a vise stand (not shown). Each leg 550 defines a proximal end 551 and a distal end 552. Leveling provision 510 is provided between the ends 551 and 552. In this version, a plurality of apertures 505 are defined along a portion of a distal leg section and at least one aperture 508 is defined in a proximal leg section. The leg sections are preferably telescopically engageable with each other. Upon aligning the apertures 505 and 508 with one another, a retention member or pin (not shown) is inserted into the aligned apertures to thereby secure the leg sections together.

Figure 10:
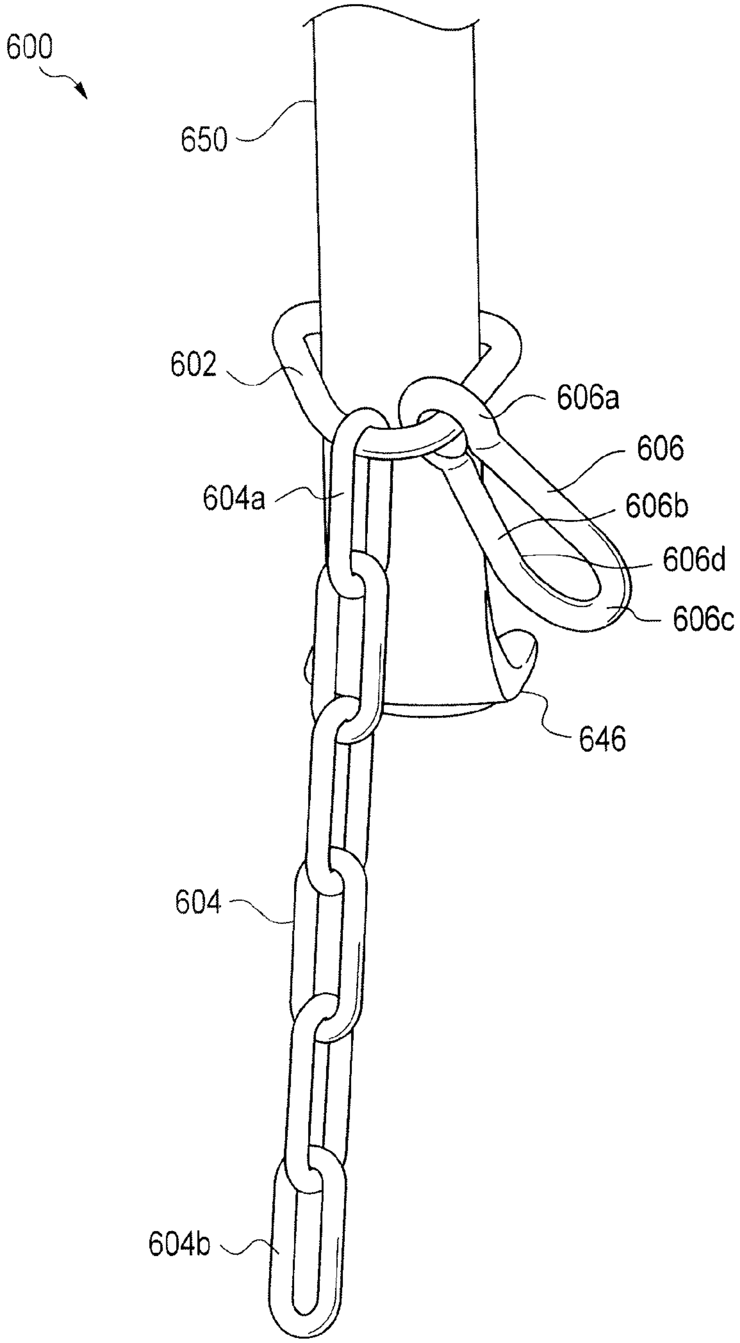
FIG. 10 is a detailed view of a preferred embodiment securing assembly used in the preferred embodiment stands.

FIG. 10 is a detailed view of a preferred embodiment securing assembly 600 provided in conjunction with the preferred embodiment stands. The securing assembly 600 generally comprises a first retention member 602, a section of chain 604 or other like member, and a clasp 606 having closure provisions. Preferably, the retention member 602 extends about and most preferably is affixed to a leg 650 of a stand, such as for example the leg 50 of the stand 10 depicted in FIG. 1. The retention member 602 is preferably positioned near the distal end of the leg 650, such as the end 646, however the invention is not limited to such arrangements. Preferably, an end 604*a* of the chain 604 is attached to the retention member 602. The opposite end 604*b* is free. The clasp 606 preferably includes an engagement end 606*a* at which the clasp 606 is engaged with the retention member 602, and a relatively larger fastening region 606*c*. The clasp 606 preferably includes a connector member 606*b* that is releasably secured to the fastening region 606*c* along a connector interface 606*d*. Typically, and after positioning the stand (not shown) in a retracted position, the chain 604 is wrapped around the other legs (not shown). The free end 604*b* of the chain 604 is secured to the clasp 606 and preferably by disengaging the connector member 606*b* from the fastening region 606*c* at connector interface 606*d*.

As will be understood, either the connector member 606*b* or the fastening region 606*c* of the clasp 606 is inserted into the end link 604*b* of the chain 604. The connector member 606*b* is then engaged with the fastening region 606*c* to "close" the clasp 606 and thereby affix the end 604*b* of the chain 604 to the clasp 606.

It will be appreciated that any of the described leveling provisions can be used in combination with other leveling provisions and used in more than one leg of the vise stands described herein. That is, in no way is the invention limited to any of the particular leveling provisions described herein.

Many other benefits will no doubt become apparent from future application and development of this technology.

All patents, published applications, and articles noted herein are hereby incorporated by reference in their entirety.

It will be understood that any one or more feature or component of one embodiment described herein can be combined with one or more other features or components of another embodiment. Thus, the present invention includes any and all combinations of components or features of the embodiments described herein.

As described hereinabove, the present invention solves many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as expressed in the appended claims.

What is claimed is:

1. A pipe vise stand engageable with an overhead stationary rigid member for increasing stability of the pipe vise stand, the pipe vise stand comprising:

a plate defining a work face, an oppositely directed underside, an edge region extending between the work face and the underside, and an aperture extending through the plate between the work face and the underside, the plate including vise provisions having a vise base projecting from the work face of the plate;

a collection of legs attached to the plate and positionable between an extended position and a retracted position;

a pipe support member disposed on the vise base, the pipe support member defining a pipe engaging face and an oppositely directed vise engaging face, the pipe support member being removable from the vise base; and a jackscrew extender removably attached to the plate, the jackscrew extender defining a proximal end, an opposite distal end extending laterally outward and beyond an edge region of the plate, and a medial region between the proximal end and the distal end, the jackscrew extender defining an aperture in the distal end configured and oriented upon affixment of the jackscrew extender to the plate to receive a jackscrew having an upwardly extending member defining a contact face for positioning against the stationary rigid member.

2. The pipe vise stand of claim 1 wherein the pipe support member defines a central region and at least two lateral members projecting from the central region, the lateral members oriented at an angle with respect to each other of from about 30° to about 160°.

3. The pipe vise stand of claim 1 wherein the pipe support member includes a plurality of serrations along the pipe engaging face.

4. The pipe vise stand of claim 1 wherein the vise engaging face of the pipe support member defines a recessed region sized and configured to fittingly receive and engage the vise base projecting from the work face of the plate.

5. The pipe vise stand of claim 1 wherein the jackscrew extender is removably attached to the plate by a threaded fastener.

6. The pipe vise stand of claim 5 wherein the jackscrew extender defines an aperture extending through the medial region of the extender, the jackscrew extender positioned along the underside of the plate and attached to the plate by the threaded fastener extending through the aperture defined in the medial region of the jackscrew extender.

7. The pipe vise stand of claim 1 wherein the jackscrew extender includes an alignment projection extending from the proximal end of the jackscrew extender.

8. The pipe vise stand of claim 7 wherein the jackscrew extender is positioned along the underside of the plate such that the alignment projection of the jackscrew extender is at least partially disposed in the aperture defined in the plate.

9. The pipe vise stand of claim 1 further comprising a jackscrew threadedly engaged in the aperture defined in the distal end of the jackscrew extender.

10. The pipe vise stand of claim 1 wherein the vise provisions include a chain.

11. The pipe vise stand of claim 10 wherein the chain has a length greater than 28 inches.

12. The pipe vise stand of claim 1 wherein the vise base defines an upwardly directed face, the surface area of the pipe engaging face of the pipe support member being greater than the surface area of the face of the vise base.

13. The pipe vise stand of claim 12 wherein the surface area of the pipe engaging face of the support member is greater than 110% of the surface area of the face of the vise base.

14. The pipe vise stand of claim 13 wherein the surface area of the pipe engaging face of the support member is greater than 125% of the surface area of the face of the vise base.

15. The pipe vise stand of claim 14 wherein the surface area of the pipe engaging face of the support member is greater than 150% of the surface area of the face of the vise base.

16. The pipe vise stand of claim 1 further comprising a leveling provision provided in association with at least one leg of the collection of legs.

17. The pipe vise stand of claim 1 further comprising a securing assembly affixed to the leg of the stand, the securing assembly including a retention member extending around the leg, a chain section having an end attached to the retention member, and a clasp engaged with the retention member and having closure provisions enabling the clasp to be selectively engaged with the chain section.

18. A system for use with a pipe vise stand for adapting the pipe vise stand to accommodate pipes having larger diameters, the pipe vise stand engageable with an overhead stationary rigid member for increasing stability of the pipe vise stand, the system comprising:

a pipe support member defining a centrally disposed region and at least two members laterally extending from the central region, the at least two members extending at an angle with respect to each other of from about 30° to about 160°, the pipe support member defining a pipe engaging face and an oppositely directed vise engaging face; and a jackscrew extender defining a proximal end, a distal end, and a medial region between the proximal end and the distal end, upon affixment of the jackscrew extender to the pipe vise stand, the distal end oriented to receive a jackscrew having an upwardly extending member defining a contact face for positioning against the stationary rigid member, and the medial region defining a bore extending at least partially through the jackscrew extender.

19. The system of claim 18 wherein the pipe support member is sized and shaped to fittingly engage a vise base of the pipe vise stand.

20. The system of claim 19 wherein the pipe support member defines at least one recessed region along its vise engaging face for fittingly receiving and engaging the vise base of a plate of the pipe vise stand.

21. The system of claim 18 wherein the angle between the at least two members is from about 100° to about 150°.

22. The system of claim 18 wherein the pipe support member includes a plurality of serrations along the pipe engaging face.

23. The system of claim 18 wherein the bore extending through the medial region of the jackscrew extender extends entirely through the medial region.

24. The system of claim 18 wherein the jackscrew extender defines an aperture extending through the distal end of the jackscrew extender, the jackscrew extender including a jackscrew threadedly engaged in the aperture extending through the distal end.

25. The system of claim 18 wherein the jackscrew extender includes an alignment projection at the proximal end of the extender.

26. A method for increasing the diameter of pipes with which a pipe vise stand can be used, the pipe vise stand engageable with an overhead stationary rigid member, the method comprising:

providing a pipe vise stand including (i) a plate defining a work face, an oppositely directed underside, and a peripheral edge extending between the work face and the underside, the plate including vise provisions having a vise base, and (ii) a plurality of legs attached to the plate;

providing a pipe support member defining a pipe engaging face and an oppositely directed vise engaging face, the pipe support member being separate and non-integral with the vise provisions;

providing a jackscrew extender defining a proximal end, a distal end, and a medial region between the proximal end and the distal end, the jackscrew extender including a jackscrew along the distal end of the extender and threadedly engaged therewith, the jackscrew having an upwardly extending member defining a contact face;

positioning the pipe support member on the vise base of the vise provisions such that the vise engaging face of the pipe support member contacts the vise base; and affixing the jackscrew extender to the plate of the pipe vise stand such that the distal end of the extender and the jackscrew included therewith are disposed laterally outward and beyond the edge of the plate, and the upwardly extending member of the jackscrew defining the contact face can be positioned against the stationary rigid member.

27. The method of claim 26 wherein the affixing is performed by forming a first aperture in the plate and a second aperture in the medial region of the jackscrew extender, aligning the first aperture and the second aperture with one another and inserting a threaded fastener through the first aperture and the second aperture.

28. The method of claim 26 wherein the plate defines a threaded aperture extending at least partially through the plate.

29. The method of claim 28 wherein the jackscrew extender defines a primary aperture extending through the medial region of the jackscrew extender, wherein affixing the jackscrew extender to the plate is performed by inserting a threaded fastener through the primary aperture of the jackscrew extender and threadedly engaging the fastener in the threaded aperture of the plate.

30. The method of claim 26 wherein the plate defines a receiving aperture along the underside of the plate and the jackscrew extender includes an alignment projection at a proximal end of the extender, wherein affixing the jackscrew extender to the plate includes inserting the alignment projection of the extender into the receiving aperture of the plate.

31. The method of claim 26 further comprising:

positioning the jackscrew threadedly engaged with the jackscrew extender such that the jackscrew is positioned against the stationary rigid member.

32. A pipe vise stand engageable with an overhead stationary rigid member for increasing stability of the pipe vise stand, the pipe vise stand comprising:

a plate defining a work face, an oppositely directed underside, an edge region extending between the work face and the underside, and an aperture extending through the plate between the work face and the underside, the plate including vise provisions having a vise base projecting from the work face of the plate;

a collection of legs attached to the plate and positionable between an extended position and a retracted position; and a jackscrew extender removably attached to the plate, the jackscrew extender defining a proximal end, an opposite distal end extending laterally outward and beyond an edge region of the plate, and a medial region between the proximal end and the distal end, the jackscrew extender defining an aperture in the distal end configured and oriented upon affixment of the jackscrew extender to the plate to receive a jackscrew having an upwardly extending member defining a contact face for positioning against the stationary rigid member.

* * * * *